Patented Dec. 23, 1924.

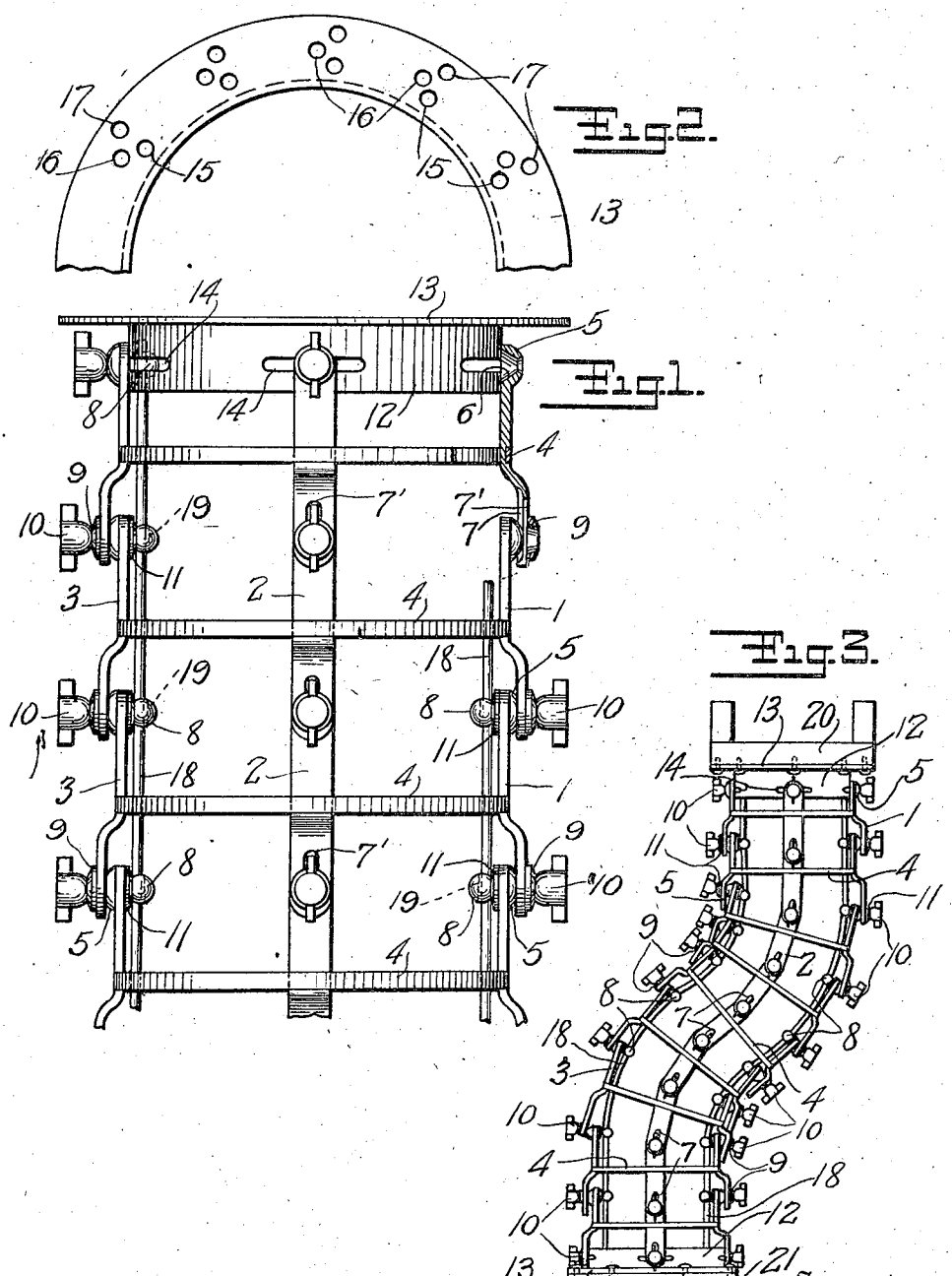

1,520,143

UNITED STATES PATENT OFFICE.

ANTON B. SANDELL, OF GROTON, CONNECTICUT, ASSIGNOR TO THE SANDELL SPECIALTIES CO., OF GROTON, CONNECTICUT, A CORPORATION OF CONNECTICUT.

ADJUSTABLE PIPE TEMPLATE.

Application filed September 13, 1920, Serial No. 409,989. Renewed June 5, 1924.

*To all whom it may concern:*

Be it known that I, ANTON B. SANDELL, a citizen of the United States of America, residing at Groton, New London County, Connecticut, have invented a new and useful Adjustable Pipe Template, of which the following is a specification.

My invention relates to the art of pipe bending, and more particularly to a template for determining accurately curves to which a pipe is to be bent.

It often happens in ship practice and elsewhere that two runs of pipe which are out of alignment with each other have to be connected by a single bent pipe. It is at present a difficult and costly task to determine the proper curves on which to bend the pipe. Heretofore it has been common practice to make a template of wood to determine the curves and such a template can be used for only the single curves for which it is constructed. This practice is expensive.

It is an object of my invention therefore to provide an adjustable template which may be cheaply made and from which the proper curves to be given a pipe section may be accurately determined.

It is a further object to provide means for insuring a proper alignment of bolt holes in the flanges of the pipes to be fitted together.

Other objects and advantages will appear as the specification proceeds.

My invention in its preferred form comprises a series of sections adjustably secured together as by means of ball and socket slotted joints. Each section comprises a plurality of bars rigidly secured together and the ball and socket joints are preferably formed in the ends of the bars and bolts are passed through the ends of the bars for adjustably securing the sections together. In order to give additional stiffness or rigidity to the template, one or more stay rods are secured to the sections as by means of passing through apertures in the bolts. When the nuts on the bolts are screwed up, the sections and stay rods form a very rigid template.

In the drawings which show merely a preferred form of my invention:

Figure 1 is a fragmentary view of a template, parts being shown in section, and parts broken away, Fig. 2 is a fragmentary view of a flange on one end of a template.

Fig. 3 is a more or less diagrammatic view showing a template and target set in place.

Each section of my adjustable template comprises a plurality of bars such as 1, 2, and 3 preferably rigidly secured together as by means of a band or hoop 4, which may be welded to or otherwise secured to the bars of each section.

Each bar is provided on one end with a ball or rounded end such as 5, and the inner part of the ball is preferably counterbored as at 6 to provide space for a bolt to move angularly with relation to the bar. The end of each bar remote from the ball end is preferably hollowed out in the form of a socket 7 for co-operation with the ball on the bar of the adjacent section. Each of the socket ends may be slotted as at 7' to accommodate a bolt such as 8 passing through both the ball and the socket for adjustably securing the ends of the bars together. Washers such as 9 may fit the outside of the sockets and provide bearings for the wing nuts 10 screwed on the bolts 8. The inner ends of the bolts are preferably substantially spherical in shape and washers such as 11 may be provided to receive the spherical bolt heads.

The outer extremities of the two end sections of the template are preferably provided with sections for co-operation with the end sections of pipes. In the form shown, the section 12 is provided with a flange 13. The section is slotted as at 14 and the bolts 8 heretofore described pass through the bars and through the slots in the section 12. This slotted connection permits the flange and section to be adjusted circumferentially relative to the template sections. The flange 13 may be provided with one or more series of apertures 15—16—17 which are spaced to conform to the spacing usually found upon pipe flanges of corresponding sizes.

When the nuts on the bolts 10 are screwed up, a rigid template is formed, but to give additional rigidity thereto, I have shown rods 18 passing through apertures 19 in the spherical heads of the bolts 8. These apertures in the bolts are of larger diameter than the rods to permit slight angular movement between these parts. When the nuts are screwed up the rods 18 are firmly pressed against and are frictionally held by the washers 11.

In operation when it is desired to determine the proper length and curvature of a pipe to connect the two end sections of two runs of pipe, my template is used as follows:—

One of the end flanges 13 (if flanged pipes are used) is bolted to the corresponding flange on the end of the run of pipe. A sufficient number of sections are provided to reach to the other pipe to be connected. The second flange 13 may then be bolted to the last mentioned pipe. The proper sweep or curve may then be given the template, this being permitted by the adjustable connections between the various sections. When the proper curve is determined, the nuts 10 are screwed up and all of the sections will then be rigidly secured together and the rods 18 will serve to give additional rigidity to the template. The end flanges 13 are next disengaged from the pipe flanges and the rigid template may then be taken into the shop to set up the targets therefrom. In Fig. 3 is shown in a somewhat diagrammatic manner two targets engaging the template. The template may be placed upon the floor or work-bench and one target 20 moved up to and engaged with the end section of the template. Another target 21 may then be moved up to and engaged with the other end sections after which both targets are fixed. The contour of the template may next be scribed on the surface of the bench. The template is then disengaged from the targets and the pipe after being bent should fit between the fixed targets and the curvature of the pipe should conform to the contour previously scribed on the bench. After a few trials or fittings, the pipe may be bent to the exact curve laid out between the targets, and by fairing up the holes in the flanges of the bent pipe and the targets, a perfect fit between the bent pipe and the two runs of pipe already in place will be assured.

By means of the template shown, it will be obvious that compound curves, that is curves in more than on plane may be determined to meet the requirements of practice.

While I have shown a specific embodiment of my invention, I wish it to be understood that various modifications and changes may be made all coming within the scope of the appended claims.

I claim:

1. An adjustable pipe template including a plurality of sections adjustably secured together to permit the template to be curved, a stay rod, and means for clamping said stay rod to some of said sections for holding the template rigid.

2. In an adjustable pipe template, a series of sections adjustably secured together, each section comprising a plurality of bars, a band for securing the bars of each section together, and means on one of the end sections for engagement with a pipe.

3. In an adjustable pipe template, a series of sections, each comprising a plurality of bars secured together, the bars of the adjacent sections having ball and socket connections with each other, bolts passing through said connections, and nuts on said bolts for securing the sections together.

4. In an adjustable pipe template, a plurality of bars having ball and socket engagement with each other, bolts passing through said bars at the connecting points, a stay rod passing through said bolts, and nuts on said bolts for securing the bars and stay rods together to form a rigid template.

5. In an adjustable pipe template, a plurality of sections, means whereby the sections are adjustably connected in series, means on the two end sections for engaging a pipe, said connecting means including ball and socket joints, means for rendering said ball and socket joints rigid, said ball and socket connections permitting said template to be curved in two planes.

6. An adjustable pipe template including a plurality of sections, means whereby the sections are connected together in series, means on the two end sections for engaging a pipe, the connecting means between some of the various sections being adapted for permitting such sections to be adjusted at various angles to each other in one plane, the connecting means between others of said sections being adapted for permitting said last mentioned sections to be adjusted at various angles to each other and in a plane at an angle to the plane of the other adjusted sections, whereby the template as a whole may be substantially curved in two planes.

7. An adjustable pipe template, comprising a plurality of sections, means whereby the sections are adjustably connected in series, means on the two ends sections for engaging a pipe, said connecting means including at least three pin and slot connections for permitting longitudinal extension of the template, and means for rendering said pin and slot connections rigid.

ANTON B. SANDELL.